(12) United States Patent
Byon et al.

(10) Patent No.: US 10,248,433 B2
(45) Date of Patent: Apr. 2, 2019

(54) NETWORK MANAGEMENT APPARATUS AND METHOD FOR REMOTELY CONTROLLING STATE OF IT DEVICE

(71) Applicant: ELECTRONICS AND TELECOMMUNICATIONS RESEARCH INSTITUTE, Daejeon (KR)

(72) Inventors: Sung Won Byon, Seongnam-si (KR); Eun Jung Kwon, Daejeon (KR); Jung Hak Kim, Daejeon (KR); Hyun Ho Park, Daejeon (KR); Yong Tae Lee, Daejeon (KR); Eui Suk Jung, Daejeon (KR); Hyun Woo Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 15/478,575

(22) Filed: Apr. 4, 2017

(65) Prior Publication Data

US 2018/0081698 A1 Mar. 22, 2018

(30) Foreign Application Priority Data

Sep. 22, 2016 (KR) .................. 10-2016-0121594

(51) Int. Cl.
*G06F 1/32* (2019.01)
*G06F 13/24* (2006.01)
(Continued)

(52) U.S. Cl.
CPC .......... *G06F 9/4418* (2013.01); *G06F 1/3287* (2013.01); *G06F 13/24* (2013.01);
(Continued)

(58) Field of Classification Search
CPC ..... G06F 9/4418; H04L 12/12; H04L 61/103; H04L 61/6022
See application file for complete search history.

(56) References Cited

U.S. PATENT DOCUMENTS

2003/0069993 A1* 4/2003 Na .................. H04L 29/12018
709/245
2007/0050645 A1* 3/2007 Siegmund ............. H04L 12/12
713/300

(Continued)

FOREIGN PATENT DOCUMENTS

KR 10-2009-0011293 A 2/2009

*Primary Examiner* — Ayaz R Sheikh
*Assistant Examiner* — Debebe A Asefa
(74) *Attorney, Agent, or Firm* — LRK Patent Law Firm

(57) ABSTRACT

A network management apparatus and method for remotely controlling a state of an IT device in order to use WOL to change a remote device from an inactive state to an active state over an IP network. The network management apparatus includes a detection pattern generator, a remote state controller, and a wake-up cause analyzer. By activating an inactivated PC connected over an IP network and positioned at a remote site using WOL to control a state of another IT device interoperating through the IP network as well as a state of the PC, it is possible to inactivate the device without unnecessarily having to leave the device on and then control the device as necessary, thereby reducing power consumption of the device and extending a lifetime of the device.

14 Claims, 7 Drawing Sheets

EXTERNAL NODE

FINAL ROUTER

IT DEVICE

(51) Int. Cl.
| | |
|---|---|
| *H04L 12/12* | (2006.01) |
| *H04L 12/40* | (2006.01) |
| *H04L 29/12* | (2006.01) |
| *G06F 9/4401* | (2018.01) |
| *G06F 1/3287* | (2019.01) |

(52) U.S. Cl.
CPC ........ *H04L 12/12* (2013.01); *H04L 12/40039* (2013.01); *H04L 61/103* (2013.01); *H04L 61/6022* (2013.01); *Y02D 10/14* (2018.01); *Y02D 10/44* (2018.01)

(56) References Cited

U.S. PATENT DOCUMENTS

| | | |
|---|---|---|
| 2009/0031124 A1 | 1/2009 | Das |
| 2009/0154421 A1 | 6/2009 | Hong et al. |
| 2010/0118737 A1 | 5/2010 | Kim et al. |

* cited by examiner

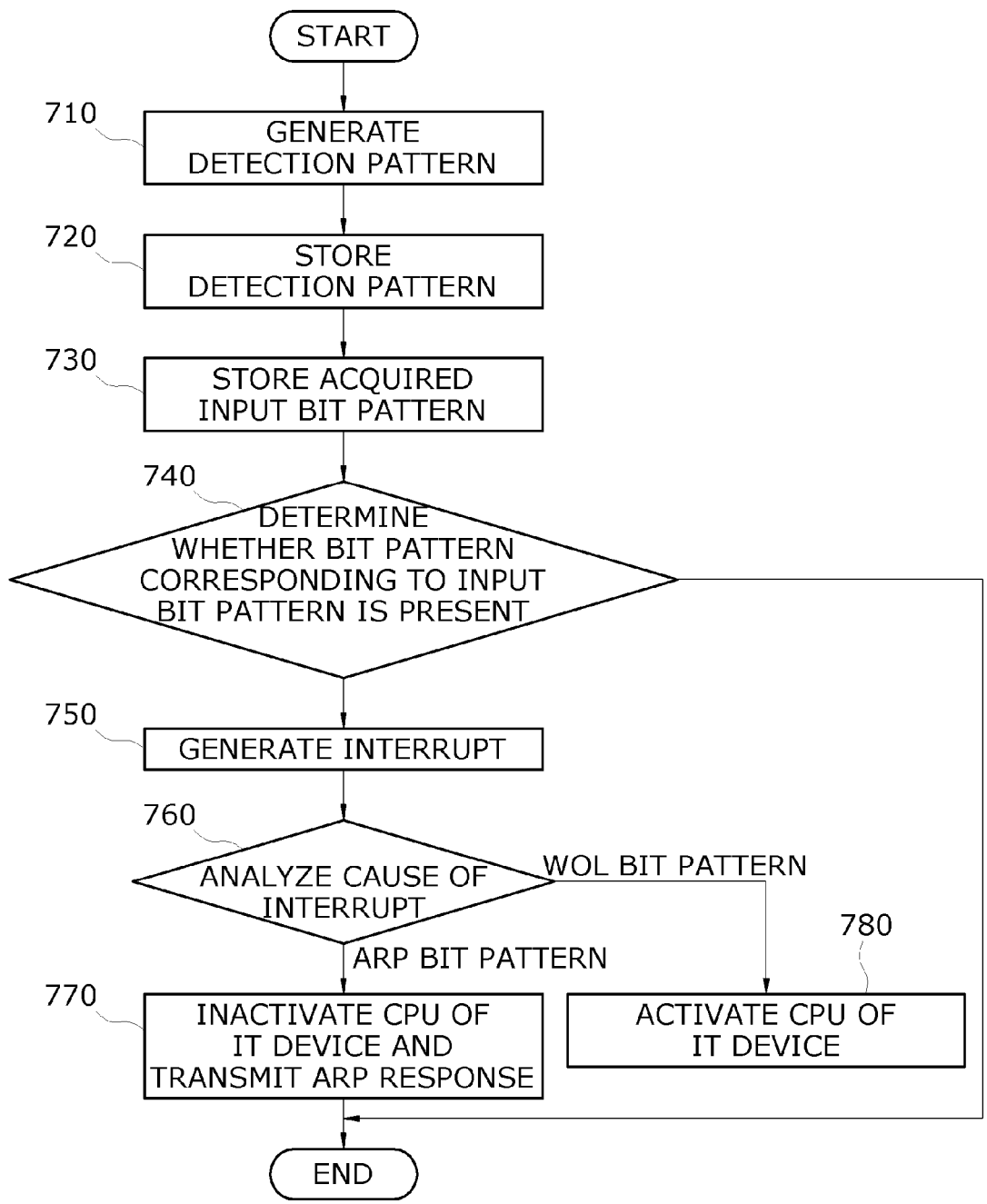

NETWORK MANAGEMENT APPARATUS AND METHOD FOR REMOTELY CONTROLLING STATE OF IT DEVICE

CROSS-REFERENCE TO RELATED APPLICATION

This application claims priority to and the benefit of Korean Patent Application No. 10-2016-0121594, filed on Sep. 22, 2016, the disclosure of which is incorporated herein by reference in its entirety.

BACKGROUND

1. Field of the Invention

The present invention relates to a network management apparatus and method for remotely controlling a state of an IT device, and more particularly, to a network management apparatus and method for remotely controlling a state of an IT device so that Wake-on-LAN (WOL) may be used to change the IT device from an inactive state to an active state over an IP network.

2. Description of Related Art

Generally, an Internet network that is used by IT devices includes layers such as a transport layer, a network layer, a data link layer, a physical layer, etc.

TCP/UDP Protocol is a layer 4 protocol, IP Protocol is a layer 3 protocol, and Ethernet Protocol is a layer 2 protocol.

Each layer has a source node and a destination node, which are entities that perform communication. The source node and the destination node perform communication using a protocol for each layer.

Since communication between any device connected to the Internet and another device on the Internet is connected over layer 3 or higher, the IP protocol needs to be used to connect to the other device on the Internet. In addition, the TCTP/UDP protocol of layer 4 is used depending on a connection scheme.

A device that is connected to a network while being inactivated and configured to receive a remote request, activate a system, and perform main operations and network interoperability can reduce power consumption by using as few resources as possible in an inactive state. Accordingly, the device turns off power provided to a central processing unit (CPU) and most input/output devices.

For a personal computer (PC), Wake-on-LAN (WOL) technology is used to transition from an inactive state to an active state through a local area network (LAN).

The WOL operates by detecting a bit stream with a specific pattern that is input to an LAN port while only the LAN port and a controller are activated.

Since the WOL operates in layer 2, the WOL may be applied to only nodes in the same subnet that is directly connected to layer 2. When the WOL is used at a remote node outside the subnet, the application thereof is difficult because connection with a target device is not guaranteed.

That is, since the target device in the inactive state is not connected with a node outside the subnet over layer 3 or higher, a message transmitted by the external node is not delivered to an inactivated node inside the subnet as long as a separate gateway does not relay the message over layer 2.

Thus, the WOL is applied by broadcasting a WOL message through a gateway having the same subnet to deliver the WOL message to all nodes in the subnet.

According to conventional technology, when a target IT device enters a standby state in which the IT device is waiting for the WOL message, the IT device is inactivated and thus cannot respond to a message received through a network. When a PC is inactivated, the PC may be in a low-power state in which its CPU is stopped to consume minimal power, and power may be partially supplied to an LAN device connected to the network.

In this case, at a predetermined time (several seconds to minutes) after the IT device enters the inactive state, routing information regarding a target device may be deleted from routing information regarding a final router, and then the transmission of an IP network to the target device may be stopped. Also, in order to prevent the routing information from being deleted, there is also a function of permanently maintaining the routing information. However, the function is not widely used due to several reasons such as complexity, security, etc. of network management.

SUMMARY

In order to solve a problem of not maintaining IP network connection of an inactivated IT device in which Wake-on-LAN (WOL) is set, the present invention provides a network management apparatus and method for remotely controlling a state of the IT device to change a target PC from an inactive state to an active state using a WOL message transmitted through an IP network in a remote site outside a subnet.

However, the technical objects of the invention are not limited to the aforementioned technical object, and it should be obvious to those skilled in the art that there may be other technical objects from the following description.

According to an aspect of the present invention, there is provided a network management apparatus for remotely controlling a state of an information technology (IT) device, the network management apparatus including a detection pattern generator configured to generate a detection pattern containing an Address Resolution Protocol (ARP) bit pattern and a WOL bit pattern which are intended to be detected; a remote state controller configured to analyze a data bit stream received over a network and determine whether there is a bit pattern that is the same as the detection pattern even when a connected IT device is in an inactive state and configured to generate an interrupt including information regarding the same bit pattern to wake up the IT device when it is determined that the same bit pattern is present; and a wake-up cause analyzer configured to analyze a cause of the wake-up according to the bit pattern included in the interrupt after the wake-up of the IT device caused by the interrupt and activate a central processing unit (CPU) of the IT device or maintain the inactive state.

In the detection pattern generator, the APR bit pattern may have a bit pattern composed of only an Internet Protocol (IP) address and a media access control (MAC) address to be detected.

In the detection pattern generator, the WOL bit pattern may have a bit pattern in which a MAC address of a network device is repeated in a specific form to be detected.

The remote state controller may further include a bit stream input unit configured to store, in a stream buffer, an input bit pattern acquired by analyzing a data bit stream input from the network; a pattern storage unit configured to store a detection pattern containing the ARP bit pattern and the WOL bit pattern; a pattern matching unit configured to determine whether a bit pattern corresponding to the input bit pattern is present in the stored detection pattern; and an interrupt generation unit configured to generate an interrupt for waking up the IT device when the corresponding bit pattern is present.

The pattern matching unit may add new input data while shifting contents of an input buffer by one byte and repeat the determination when no bit pattern corresponding to the input bit pattern is present in the stored detection pattern.

The wake-up cause analyzer may set the CPU of the IT device to the inactive state and receive an ARP response when the bit pattern included in the interrupt is the ARP bit pattern and may transmit a WOL request to set the CPU of the IT device to an active state when the bit pattern included in the interrupt is the WOL bit pattern.

The network management apparatus may further include an IP layer WOL detector configured to wait for a WOL packet for a predetermined protocol and port number when a response to the ARP request is received after the wake-up of the IT device and configured to detect the WOL packet and activate the IT device when the WOL packet arrives at a port corresponding to the port number.

According to another aspect of the present invention, there is provided a network management method for remotely controlling a state of an information technology (IT) device, the network management method including generating a detection pattern containing an Address Resolution Protocol (ARP) bit pattern and a Wake-on-LAN (WOL) bit pattern which are intended to be detected; analyzing a data bit stream received over a network and determining whether there is a bit pattern that is the same as the detection pattern even when a connected IT device is in an inactive state and generating an interrupt including information regarding the same bit pattern to wake up the IT device when it is determined that the same bit pattern is present; and analyzing a cause of the wake-up according to the bit pattern included in the interrupt after the wake-up of the IT device caused by the interrupt and activating a central processing unit (CPU) of the IT device or maintaining the inactive state.

In the generating of a detection pattern, the APR bit pattern may have a bit pattern composed of only an Internet Protocol (IP) address and a media access control (MAC) address to be detected.

In the generating of a detection pattern, the WOL bit pattern may have a bit pattern in which a MAC address of a network device is repeated in a specific form to be detected.

The generating of an interrupt may include storing, in a stream buffer, an input bit pattern acquired by analyzing a data bit stream input from the network; storing a detection pattern containing the ARP bit pattern and the WOL bit pattern; determining whether a bit pattern corresponding to the input bit pattern is present in the stored detection pattern; and generating an interrupt for waking up the IT device when the corresponding bit pattern is present.

The determining of whether a corresponding bit pattern is present may include adding new input data while shifting contents of an input buffer by one byte and repeating the determination when no bit pattern corresponding to the input bit pattern is present in the stored detection pattern.

The activating of a CPU of the IT device or the maintaining of the inactive state may include setting the CPU of the IT device to the inactive state and receiving an ARP response when the bit pattern included in the interrupt is the ARP bit pattern and transmitting a WOL request to set the CPU of the IT device to an active state when the bit pattern included in the interrupt is the WOL bit pattern.

The network management method may further include waiting for a WOL packet for a predetermined protocol and port number when a response to the ARP request is received after the wake-up of the IT device and detecting the WOL packet and activating the IT device when the WOL packet arrives at a port corresponding to the port number.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 7 is a flowchart of a network management method for remotely controlling a state of an IT device according to an embodiment of the present invention.

DETAILED DESCRIPTION OF EXEMPLARY EMBODIMENTS

Figure 1:
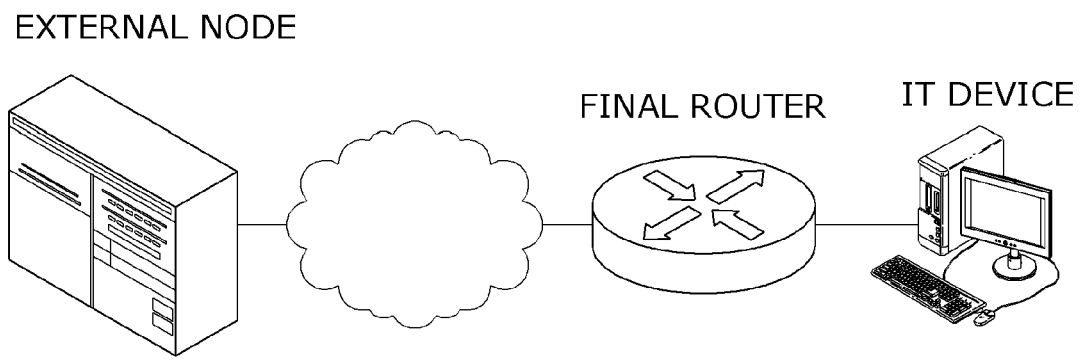
FIG. 1 is a diagram showing an example of a network environment according to an embodiment of the present invention.

Hereinafter, example embodiments will be described in detail with reference to the accompanying drawings so that they can be easily practiced by those skilled in the art to which the present invention pertains. The example embodiments may, however, be embodied in many different forms and should not be construed as being limited to the embodiments set forth herein.

In the accompanying drawings, portions irrelevant to a description of the example embodiments will be omitted for clarity. Moreover, like reference numerals refer to like elements throughout.

Furthermore, when one part is referred to as "comprising" (or "including" or "having") other elements, it should be understood that it can comprise (or include or have) only those elements, or other elements as well as those elements unless specifically described otherwise.

A network management apparatus and method for remotely controlling a state of an IT device according to an embodiment of the present invention will be described below with reference to the accompanying drawings.

FIG. 1 is a diagram showing an example of a network environment according to an embodiment of the present invention.

Referring to FIG. 1, a network environment according to an embodiment of the present invention may be implemented with an IT device such as an external node, a final router, and a personal computer.

According to an embodiment of the present invention, an IT device such as a PC which is to be remotely controlled may be classified into three states.

A first state is an active state in which a CPU and peripheral devices are activated so that an IT device may perform general tasks.

A second state is an inactive state in which a CPU of an IT device is suspended. In the second state, power to ancillary devices is blocked or minimized for the purpose of power saving. In this state, in order to detect a remote control message transmitted from a network, power may be supplied to a network device.

A third state is a wake-up state in which a change may be made to an active state or an inactive state by supplying power to a CPU and managing a network device through a task performed by the CPU.

According to an embodiment of the present invention, in the wake-up state, a CPU and a network device of the PC are activated, and other IO devices are not activated.

Referring to FIG. 1, an external node and an IT device may be connected through a final router to interoperate with each other.

An operation environment of the present invention is the same as an operation environment of a general IT device such as a PC connected to the Internet. In this operation environment, a state transition message generated from an external node at a remote place may be detected through an additional function provided by the IT device among elements of the operation environment.

In this case, when the IT device enters the inactive state, the PC cannot perform an IP (layer 3) layer protocol while the CPU is stopped. In this case, the final router maintains Address Resolution Protocol (ARP) information for mapping an IP address of the PC (a layer 3 address) to a MAC address of a network device installed in the PC (a layer 2 address). Here, the basic ARP information may be configured as a pair of the IP address and the MAC address such as (129.254.63.101, 78:24:af:88:dc:9b).

According to an embodiment of the present invention, the ARP information has a lifetime of a certain time (several minutes or less). The ARP information is treated as invalid information and discarded after the lifetime expires.

After the ARP information regarding the PC is discarded, routing information can no longer be delivered even when an IP packet for an IP address of a target PC arrives at the final router.

Figure 2:
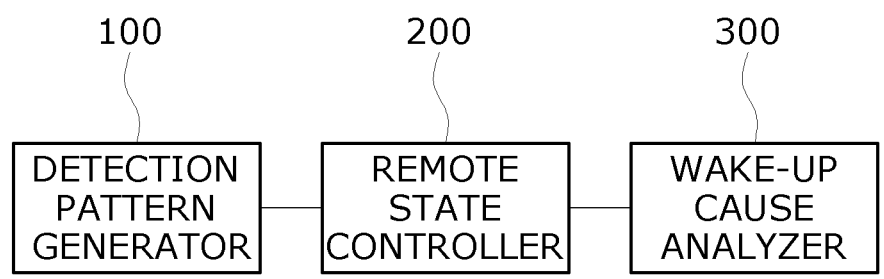
FIG. 2 is a block diagram showing a network management apparatus for remotely controlling a state of an IT device according to a first embodiment of the present invention.

FIG. 2 is a block diagram showing a network management apparatus for remotely controlling a state of an IT device according to a first embodiment of the present invention.

As shown in FIG. 2, the network management apparatus for remotely controlling a state of an IT device according to a first embodiment of the present invention may be connected to the IT device. When the network management apparatus may be connected between the final router and the IT device, the network management apparatus may be located inside or outside the IT device without any limitations Referring to FIG. 2, the network management apparatus for remotely controlling a state of an IT device according to the first embodiment of the present invention may include a detection pattern generator 100, a remote state controller 200, and a wake-up cause analyzer 300.

The detection pattern generator 100 may generate a detection pattern containing an ARP bit pattern and a WOL bit pattern which are intended to be detected. Here, the ARP bit pattern may have a bit pattern of the entire ARP packet to be detected or may have a bit pattern composed of only an IP address and a MAC address to be detected.

A bit pattern in which a MAC address of the network device is repeated in a specific form may be detected from the WOL bit pattern.

The remote state controller 200 may include a pattern storage and may store the ARP bit pattern and the WOL bit pattern included in the detection pattern generated by the detection pattern generator 100 in the pattern storage.

Also, even when the connected IT device is inactivated, the remote state controller 200 may analyze a data bit stream received over a network, determine whether a bit pattern that is the same as the detection pattern is present, and generate an interrupt containing information regarding the same bit pattern, which is used to wake up the IT device, when it is determined that a bit pattern that is the same as the detection pattern is present. Here, the interrupt may be generated in response to an ARP request signal.

The remote state controller 200 may wake up the IT device by transmitting the interrupt generated in response to the ARP request signal to the IT device and may receive an ARP response corresponding to ARP request.

After waking up the IT device through the interrupt, the wake-up cause analyzer 300 may analyze a wake-up cause according to the bit pattern included in the interrupt and activate the CPU of the IT device or maintain the inactive state of the CPU.

According to an embodiment of the present invention, the wake-up cause analyzer 300 may transmit an ARP response and set the CPU of the IT device to the inactive state when the bit pattern included in the interrupt is the ARP bit pattern and may transmit a WOL request to set the CPU of the IT device to the active state when the bit pattern included in the interrupt is the WOL bit pattern.

Figure 3:
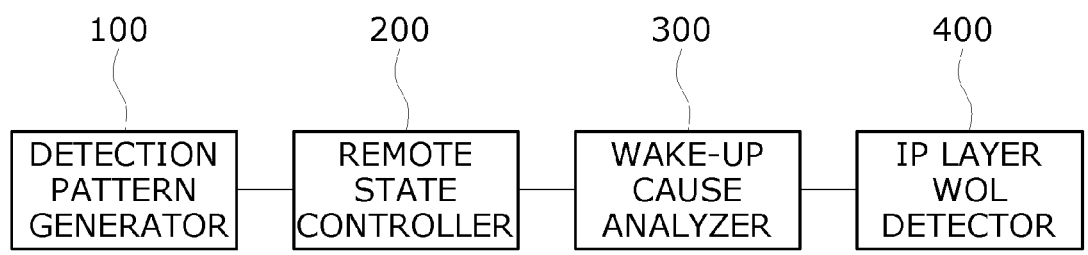
FIG. 3 is a block diagram showing a network management apparatus for remotely controlling a state of an IT device according to a second embodiment of the present invention.

FIG. 3 is a block diagram showing a network management apparatus for remotely controlling a state of an IT device according to a second embodiment of the present invention.

Referring to FIG. 3, the network management apparatus for remotely controlling a state of an IT device according to the second embodiment of the present invention may further include an IP layer WOL detector 400 in addition to the components of the network management apparatus for remotely controlling a state of an IT device according to the first embodiment of the present invention shown in FIG. 2.

The IP layer WOL detector 400 may wait for a WOL packet for a predetermined protocol and port number when a response to the ARP request is received after the wake-up of the IT device and may detect the WOL packet and activate the IT device when the WOL packet arrives at a port corresponding to the port number.

According to an embodiment of the present invention, the IP layer WOL detector 400 may be further included for an exceptional case in which the WOL packet arrives while there is no APR information because the final router does not make the ARP request although the lifetime of the ARP information has expired.

In this case, the IP layer WOL detector 400 operates to receive the WOL packet while the IT device wakes up due to the ARP request.

Figure 4:
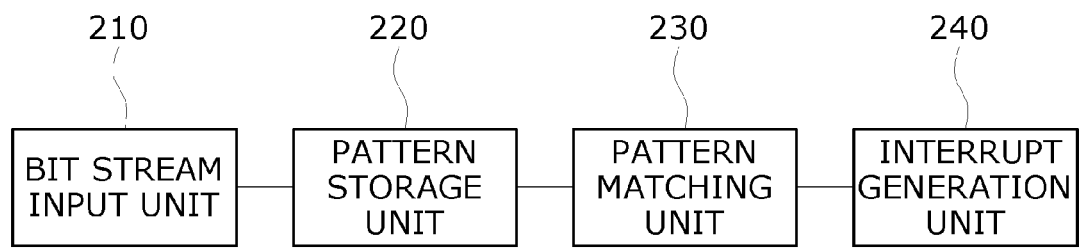
FIG. 4 is a detailed block diagram of a remote state controller shown in FIG. 2.

FIG. 4 is a detailed block diagram of the remote state controller 200 shown in FIG. 1.

Referring to FIG. 4, the remote state controller 200 may include a bit stream input unit 210, a pattern storage unit 220, a pattern matching unit 230, and an interrupt generation unit 240.

The bit stream input unit 210 may store an input bit pattern acquired by analyzing a data bit stream input from a network in a stream buffer.

The pattern storage unit 220 may store a detection pattern containing an ARP bit pattern and a WOL bit pattern. Here, the ARP bit pattern and the WOL bit pattern indicate the detection pattern generated by the detection pattern generator 100.

The pattern matching unit 230 may determine whether a bit pattern corresponding to the input bit pattern is present in the stored detection pattern.

According to an embodiment of the present invention, the pattern matching unit 230 may add new input data while shifting the contents of an input buffer by one byte and then repeat the determination when no bit pattern corresponding to the input bit pattern is present in the stored detection pattern.

When the corresponding bit pattern is present, the interrupt generation unit 240 may generate an interrupt for waking up the IT device and transmit the generated interrupt to the CPU and the wake-up cause analyzer 300 of the IT device.

According to an embodiment of the present invention, the interrupt generated by the interrupt generation unit 240 may be transmitted to a matching result storage. However, when there is no matching result storage, the interrupt may be transmitted and stored in a stream buffer.

Figure 5:
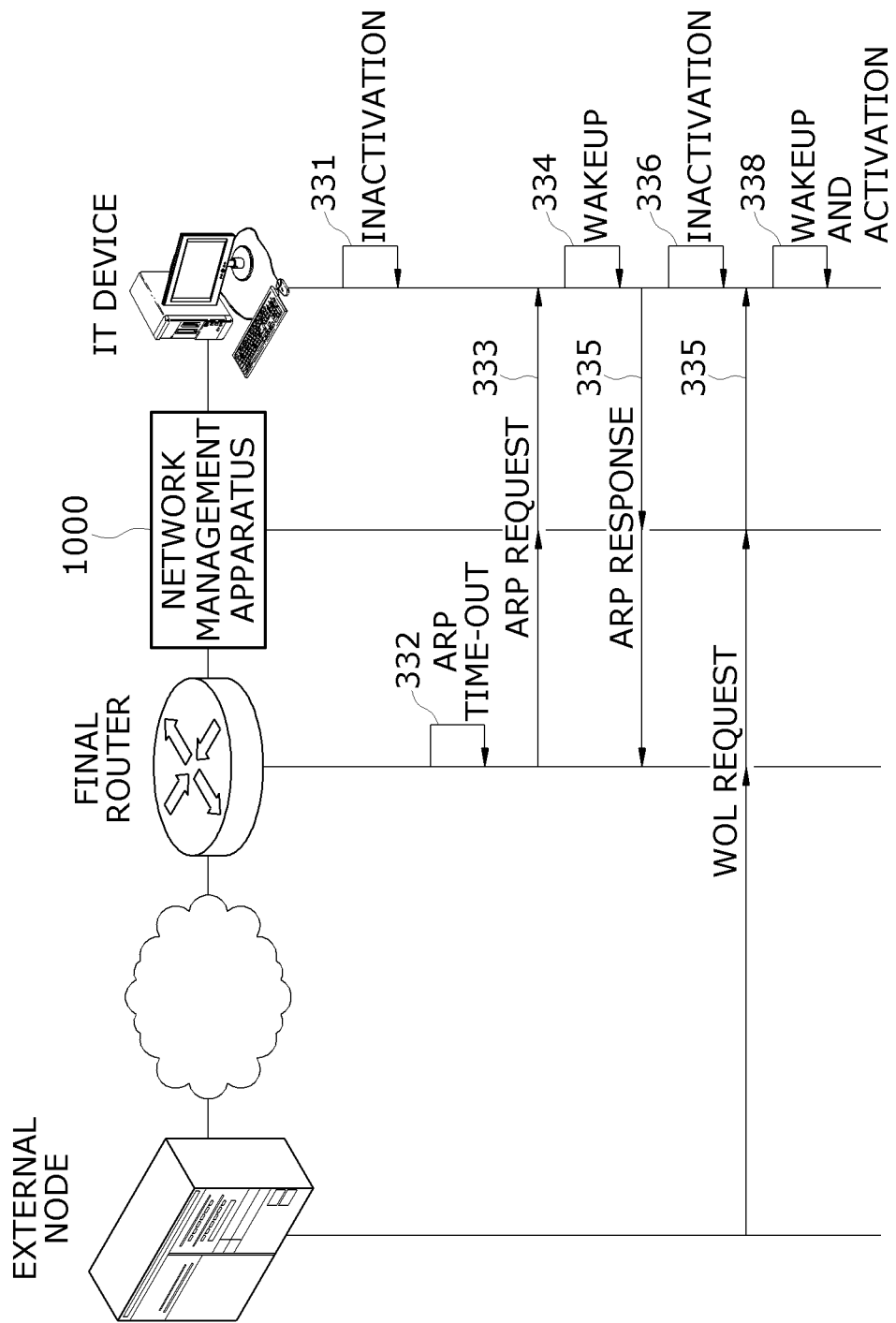
FIG. 5 is a diagram showing data flow between devices connected with the network management apparatus according to the first embodiment of the present invention.

FIG. 5 is a diagram showing data flow between devices connected with the network management apparatus 1000 according to the first embodiment of the present invention.

Referring to FIG. 5, first, an IT device may be set to an inactive state if necessary (e.g., power saving) (331).

Since the IT device is inactivated, no network data is generated by the IT device. In this case, the lifetime of the ARP information of the final router may expire after a certain time, and the ARP information of the final router may be deleted (332).

In order to restore the deleted information, the final router may broadcast an ARP request in a subnet (according to an embodiment in which an interrupt is implemented with the ARP request) (333).

In this case, the IT device may detect an ARP request for an IP address allocated to the IT device through the connected network management apparatus 1000 and may wake up the IT device (334).

When it is analyzed that the wake-up is caused by the ARP request through the wake-up cause analyzer 300 of the network management apparatus 1000, the IT device may generate an ARP response and transmit the generated ARP response to the final router (335).

After transmitting the ARP response, the IT device may enter the inactive state again (336).

When an external node transmits a WOL packet, the WOL packet arrives at the final router in the IP network. The final router may deliver the WOL packet to the IT device via the network management apparatus 1000 by using the ARP information (337).

IT device may perform wake-up and activation due to the WOL packet (338).

Figure 6:
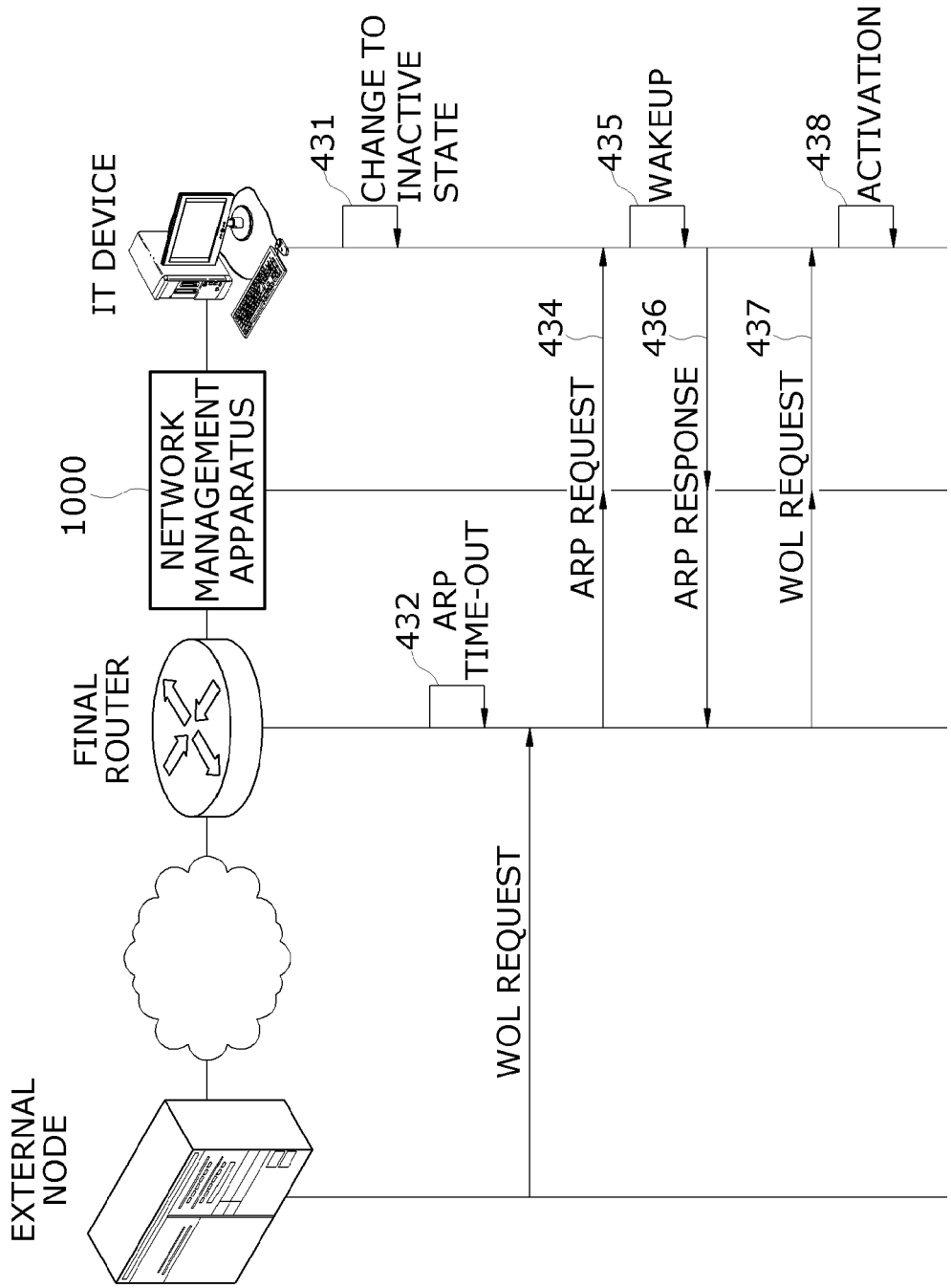
FIG. 6 is a diagram showing data flow between devices connected with the network management apparatus according to the second embodiment of the present invention.

FIG. 6 is a diagram showing data flow between devices connected with the network management apparatus 1000 according to the second embodiment of the present invention.

Referring to FIG. 6, data flow between devices connected with the network management apparatus according to the second embodiment is shown in a case in which a WOL packet arrives while there is no APR information because the final router does not make the ARP request although the lifetime of the ARP information has expired.

At a certain time after the IT device is inactivated (431), the ART information may be deleted (432).

In this case, the external node may transmit a WOL packet through an IP network (433).

In this case, the final router may broadcast an ARP request for a corresponding IP in its own subnet because the final router no longer has routing information regarding the IT device.

The network management apparatus 1000 may detect the ARP request (434) and wake up the IT device (435).

The network management apparatus 1100 may determine a cause of the wake-up of the IT device and transmit an ARP response (436).

The final router may receive the ARP response, update the ARP information, and transmit the WOL packet that has arrived and is waiting for delivery to the IT device through the network management apparatus 1100 (437).

The IT device may be activated through the transmitted WOL packet (438).

In this case, since the IT device is woken up, the delivered WOL packet is not delivered through WOL detection of the network device. In order to deal with this exceptional situation, the IP layer WOL detector 400 may detect the delivered WOL packet in the IP layer.

According to an embodiment of the present invention, when the ARP response is received after the wake-up, the IP layer WOL detector 400 may wait for a WOL packet for a predetermined protocol and port number. When the WOL packet arrives at a corresponding port, the IP layer WOL detection unit 400 may detect the WOL packet and activate the PC.

For example, the external node may transmit the WOL packet to an IP address (UDP, port number 4010) of a target PC, and the IP layer WOL detector 400 of the network management apparatus 1100 connected to the IT device may wait for a response by the port.

FIG. 7 is a flowchart of a network management method for remotely controlling a state of an IT device according to an embodiment of the present invention.

The network management method includes generating a detection pattern containing an ARP bit pattern and a WOL bit pattern which are intended to be detected, in an inactive state before entering the inactive state (710).

According to an embodiment of the present invention, a detection pattern containing the ARP bit pattern and the WOL bit pattern which are intended to be detected may be generated.

According to an embodiment of the present invention, the ARP bit pattern may have a bit pattern of the entire APR packet to be detected. However, according to another embodiment, the ARP bit pattern has a bit pattern composed of only an IP address and a MAC address to be detected.

According to an embodiment of the present invention, the bit pattern may have a bit pattern in which a MAC address of the network device is repeated in a specific form to be detected.

The network management method includes storing the detection pattern containing the ARP bit pattern and the WOL bit pattern (720).

According to an embodiment of the present invention, the detection pattern containing the ARP bit pattern and the WOL bit pattern may be stored.

Here, the ARP bit pattern and the WOL bit pattern indicate the detection pattern generated in the above-described step.

The network management method includes inactivating the IT device and storing an input bit pattern acquired by analyzing a data bit stream to be detected in the inactive state in a stream buffer (730).

According to an embodiment of the present invention, an input bit pattern acquired by analyzing a data bit stream input from a network may be stored in a stream buffer.

The network management method includes determining whether a bit pattern corresponding to the input bit pattern is present in the stored detection pattern (740).

According to an embodiment of the present invention, it may be determined whether a bit pattern corresponding to the input bit pattern is present in the stored detection pattern.

According to an embodiment of the present invention, when no bit pattern corresponding to the input bit pattern is present in the stored detection pattern, new input data may be added while the contents of an input buffer are shifted by one byte and then the determination may be repeated.

The network management method includes generating an interrupt for waking up the IT device when the bit pattern is present (750).

According to an embodiment of the present invention, when the bit pattern is present, an interrupt for waking up the IT device may be generated.

According to an embodiment of the present invention, the generated interrupt may be transmitted to matching result storage. However, when there is no matching result storage, the interrupt may be transmitted and stored in a stream buffer.

The network management method includes analyzing a cause of the wake-up (760), transmitting an ARP response when the bit pattern included in the interrupt is a bit pattern of an ARP request as a result of the analysis (770), and setting the CPU to an inactive state.

According to an embodiment of the present invention, the CPU of the IT device may be activated or remain in the inactive state by analyzing the cause of the wake-up according to a bit pattern included in the interrupt after the wake-up of the IT device caused by the interrupt.

According to an embodiment of the present invention, when the bit pattern included in the interrupt is the ARP bit pattern, an ARP response may be transmitted, and the CPU of the IT device may be set to the inactive state.

As an analysis result, when the bit pattern included in an interrupt obtained by analyzing the cause of the wake-up is the WOL bit pattern, the WOL request is transmitted, and the CPU of the IT device is set to the active state (780).

According to an embodiment of the present invention, when the bit pattern included in the interrupt is the WOL bit pattern, a WOL request may be transmitted, and the CPU of the IT device may be set to the active state.

According to an embodiment of the present invention, by providing a method of delivering an IP layer packet to an inactivated PC, it is possible to provide an additional function to a PC to be woken up without modification of network infrastructure such as a router, a gateway, etc, in a general Internet environment.

According to an embodiment of the present invention, by activating an inactivated PC connected over an IP network and positioned at a remote site using WOL to control a state of another IT device interoperating through the IP network as well as a state of the PC, it is also possible to inactivate a device without unnecessarily having to leave the device on and then control the device as necessary.

Also, according to an embodiment of the present invention, by inactivating a device without unnecessarily having to leave the device on and then controlling the device as necessary, it is possible to reduce power consumption of an IT device and extending a lifetime of the device.

The example embodiments are not limited to being implemented only through the above-described apparatus and/or method. Although the example embodiments have been described in detail, the scope of the present invention is not limited thereto, and modifications and alterations made by those skilled in the art using the basic concept of the present invention defined in the following claims fall within the scope of the present invention.

What is claimed is:

1. A network management apparatus for remotely controlling a state of an information technology (IT) device connected to the network management apparatus, the network management apparatus comprising:
   a detection pattern generator configured to generate a detection pattern containing an Address Resolution Protocol (ARP) bit pattern and a Wake-on-LAN (WOL) bit pattern as a detection target;
   a remote state controller configured to, even when the IT device is in an inactive state, analyze a data bit stream received over a network connected to the IT device to determine whether the data bit stream includes a bit pattern that is the same as the detection pattern, and generate an interrupt including information regarding the same bit pattern to wake up the IT device when the same bit pattern is determined to be present in the data bit stream; and
   a wake-up cause analyzer configured to, after the wake-up of the IT device caused by the interrupt, analyze a cause of the wake-up according to the bit pattern included in the interrupt to activate a central processing unit (CPU) of the IT device or maintain the inactive state of the IT device.

2. The network management apparatus of claim 1, wherein in the detection pattern generator, the APR bit pattern has a bit pattern composed only of an Internet Protocol (IP) address and a media access control (MAC) address as a detection target.

3. The network management apparatus of claim 1, wherein in the detection pattern generator, the WOL bit pattern has a bit pattern composed of a MAC address of a network device which is repeated in a specific form as a detection target.

4. The network management apparatus of claim 1, wherein the remote state controller comprises:
   a bit stream input unit configured to store, in a stream buffer, an input bit pattern acquired by analyzing the data bit stream received over the network;
   a pattern storage unit configured to store the detection pattern containing the ARP bit pattern and the WOL bit pattern;
   a pattern matching unit configured to determine whether a bit pattern corresponding to the input bit pattern is present in the stored detection pattern; and
   an interrupt generation unit configured to generate an interrupt for waking up the IT device when the corresponding bit pattern is present in the stored detection pattern.

5. The network management apparatus of claim 4, wherein when no bit pattern corresponding to the input bit pattern is present in the stored detection pattern, the pattern matching unit adds new input data by shifting contents of an input buffer by one byte and repeats the determination.

6. The network management apparatus of claim 1,
   wherein the wake-up cause analyzer sets the CPU of the IT device to the inactive state and receives an ARP response when the bit pattern included in the interrupt is the ARP bit pattern, and
   wherein the wake-up cause analyzer transmits a WOL request to set the CPU of the IT device to an active state when the bit pattern included in the interrupt is the WOL bit pattern.

7. The network management apparatus of claim 6, further comprising an IP layer WOL detector configured to wait for a WOL packet for a predetermined protocol and port number when a response to the ARP request is received after the wake-up of the IT device and configured to detect the WOL packet and activate the IT device when the WOL packet arrives at a port corresponding to the port number.

8. A network management method for remotely controlling a state of an information technology (IT) device connected to a network management apparatus, the network management method comprising:
   generating a detection pattern containing an Address Resolution Protocol (ARP) bit pattern and a Wake-on-LAN (WOL) bit pattern as a detection target;
   even when the IT device is in an inactive state, analyzing a data bit stream received over a network connected to the IT device to determine whether the data bit stream includes a bit pattern that is the same as the detection pattern, and generating an interrupt including information regarding the same bit pattern to wake up the IT device when the same bit pattern is determined to be present in the data bit stream; and
   after the wake-up of the IT device caused by the interrupt, analyzing a cause of the wake-up according to the bit pattern included in the interrupt to activate a central processing unit (CPU) of the IT device or maintain the inactive state of the IT device.

9. The network management method of claim 8, wherein in the generating of a detection pattern, the APR bit pattern has a bit pattern composed only of an Internet Protocol (IP) address and a media access control (MAC) address as a detection target.

10. The network management method of claim 8, wherein in the generating of a detection pattern, the WOL bit pattern has a bit pattern composed of a MAC address of a network device which is repeated in a specific form as a detection target.

11. The network management method of claim 8, wherein the generating of an interrupt comprises:
   storing, in a stream buffer, an input bit pattern acquired by analyzing the data bit stream received over the network;
   storing the detection pattern containing the ARP bit pattern and the WOL bit pattern;
   determining whether a bit pattern corresponding to the input bit pattern is present in the stored detection pattern; and
   generating an interrupt for waking up the IT device when the corresponding bit pattern is present in the stored detection pattern.

12. The network management method of claim 11, wherein when no bit pattern corresponding to the input bit pattern is present in the stored detection pattern, the determining of whether the corresponding bit pattern is present comprises adding new input data by shifting contents of an input buffer by one byte and repeating the determination.

13. The network management method of claim 8,
   wherein the activating of the CPU of the IT device or the maintaining of the inactive state of the IT device comprises setting the CPU of the IT device to the inactive state and receiving an ARP response when the bit pattern included in the interrupt is the ARP bit pattern, and
   wherein the activating of the CPU of the IT device or the maintaining of the inactive state of the IT device comprises transmitting a WOL request to set the CPU of the IT device to an active state when the bit pattern included in the interrupt is the WOL bit pattern.

14. The network management method of claim 13, further comprising waiting for a WOL packet for a predetermined protocol and port number when a response to the ARP request is received after the wake-up of the IT device and detecting the WOL packet and activating the IT device when the WOL packet arrives at a port corresponding to the port number.

* * * * *